United States Patent [19]
Pauly et al.

[11] 3,918,291
[45] Nov. 11, 1975

[54] METHOD AND APPARATUS FOR TESTING LEAKAGE RATE

[75] Inventors: Joachim W. Pauly, Woodland Hills; Wilbur Stanley Leinberry, Studio City, both of Calif.

[73] Assignee: Sterer Engineering & Mfg. Co., Los Angeles, Calif.

[22] Filed: May 7, 1974

[21] Appl. No.: 467,805

Related U.S. Application Data

[63] Continuation-in-part of Ser. No. 338,377, March 5, 1973, abandoned.

[52] U.S. Cl. .................................. 73/40; 73/49.2
[51] Int. Cl.² ........................................ G01M 3/26
[58] Field of Search ............................. 73/40, 49.2

[56] References Cited
UNITED STATES PATENTS

| | | | |
|---|---|---|---|
| 2,345,387 | 3/1944 | Elsey....................... | 73/40 |
| 2,771,769 | 11/1956 | Nielsen..................... | 73/40 |
| 3,360,981 | 1/1968 | Badger..................... | 73/40 |
| 3,691,821 | 9/1972 | Davey...................... | 73/49.2 |
| 3,813,922 | 6/1974 | Oswald et al. ............. | 73/49.2 |
| 3,872,712 | 3/1975 | Westervelt et al. ......... | 73/40 |

Primary Examiner—Richard C. Queisser
Assistant Examiner—Joseph W. Roskos
Attorney, Agent, or Firm—Fulwider, Patton, Rieber, Lee & Utecht

[57] ABSTRACT

Method and apparatus for testing the leakage of air from a vessel such as a submarine, by establishing a selected test pressure level in the vessel, establishing a regulated test flow to the vessel, monitoring the pressure in the vessel, and determining whether the leakage rate from the vessel exceeds a predetermined rate by relating the test flow rate to its effect on the pressure level in the vessel. In one mode of operation, a variable test flow is delivered to the vessel and adjusted as needed to maintain pressure in the vessel at the test level, the rate and temperature of this flow are accurately measured when stabilized, and the measured values are converted to standard units. In a second mode of operation, a metered flow rate that is equivalent to the maximum permissible leakage rate is introduced to the vessel, and the effect of this flow on vessel pressure indicates the relation between the actual leakage rate and the test flow rate. Both modes utilize test apparatus including basically conventional components, that can be compactly mounted in a suitcase-like housing, along with tables for converting measured values into standard values.

21 Claims, 5 Drawing Figures

METHOD AND APPARATUS FOR TESTING LEAKAGE RATE

CROSS-REFERENCE TO RELATED APPLICATION

This is a continuation-in-part of application Ser. No. 338,377, filed Mar. 5, 1973, entitled METHOD AND APPARATUS FOR MEASURING LEAKAGE RATE, now abandoned.

BACKGROUND OF THE INVENTION

This invention relates to the testing of the rate of leakage of fluid, and particularly gas such as air, from a pressurized vessel or system, and has specific reference to the measuring of the rate of leakage of air from submarines, in so-called "drop testing" which is performed as an inspection procedure on new submarines and thereafter from time to time during the life of the submarine.

As presently practiced, drop testing is a complicated and time-consuming proposition, primarily because of the large volume of space involved, the high and variable pressure levels at which the tests are conducted, in the area of 4000 pounds per square inch (psi), and the temperature and pressure variables that are encountered. Moreover, military specifications permit a maximum leakage rate at existing temperature and pressure levels that is the equivalent of 2.5 cubic feet per minute at a standard temperature of 70°F and a standard pressure of 14.7 psi, so the leakage rate must be determined with a high degree of accuracy.

Because of these factors, present test procedures result in a cost of many thousands of dollars per test, and efforts are being made to find a simplified and less expensive way to conduct such tests with the necessary accuracy. One approach that has been suggested involves the use of two ten cubic foot supply flasks, which would be charged with air at a pressure of about 4500 psi, typically from the same dockside source used to pressurize the submarine preparatory to the test, and a thermally insulated 0.5 cubic foot flask. Ship's pressure would be introduced into the insulated flask and measured as a reference pressure, and the temperature also would be measured in this flask. Then, as air leakage from the ship occurred, air would be bled from the supply flasks to maintain the pressure at a selected test level. Since the exact volume of the supply flasks would be known, the pressure drop in the supply flasks could be converted, with the aid of a table, into a flow rate representing system leakage.

While testing in this manner appears to be feasible and an improvement over the present method, the procedure also would remain relatively complex and would require heavy, bulky and relatively expensive equipment that would not be conveniently portable or capable of being stored on board the submarine so as to be available whenever and wherever needed. The primary objective of the present invention is to provide methods and apparatus for such testing that are significantly simpler and less expensive, while at the same time having a high degree of accuracy and utilizing components which can be compactly mounted in a truly portable assembly weighing in the vicinity of one hundred pounds.

SUMMARY OF THE INVENTION

The present invention resides in the method and apparatus for testing the leakage rate by introducing a regulated flow into the vessel, monitoring the pressure level in the vessel, and determining whether the leakage rate exceeds the permissible level by relating the test flow rate to its effect on the pressure level. Two alternative modes of operation are provided, with minor equipment changes.

One mode uses a variable test flow that is adjusted to hold the vessel pressure constant, and thus to match the leakage rate, before its flow rate and temperature are accurately measured for conversion of the measured flow rate to the equivalent standard flow rate at a standard temperature. This mode thus measures the existing leakage rate at the test pressure.

The second mode introduces a constant, measured flow rate to the vessel, equal to the maximum permissible leakage, and senses the effect of this constant flow on the vessel pressure. A decrease in pressure from the established test level indicates that leakage exceeds the test flow, and thus exceeds the permissible maximum. A steady pressure, or an increase, indicates that leakage equals, or does not exceed, the maximum. This mode may be regarded as a "go-no go" system, for rapidly testing whether specifications are met.

The apparatus for the measuring mode has instruments for measuring the rate and temperature of the variable flow, with a high degree of accuracy, when the latter has been adjusted to the level required to maintain the vessel pressure constant under stable conditions. Also included is a very accurate gauge for vessel pressure. The measured readings are used to determine the leakage rate in standard units.

The primary difference in the apparatus of the second mode is the provision of a metering orifice which will deliver a predetermined flow rate of the test fluid, with a high degree of accuracy, when subjected to a predetermined pressure differential, and a gauge for measuring that pressure differential. An orifice is provided that will deliver a flow equal to the maximum permissible leakage rate, and the pressure differential for producing that rate is accurately determined, in advance, and specified for the orifice. In this mode, there is no need for the very accurate flow meter used in the first mode.

The apparatus of the invention can be compactly mounted in a portable, suitcase-like housing capable of being handled by one man, and small enough to be stowed on board a submarine, if desired. The source of fluid under pressure can be a dockside compressor or simply a cylinder charged to a pressure well above the system test pressure. Reference tables preferably are provided for use in converting measured values to standard units, and for selection of orifices and pressure differentials for given test requirements.

Other aspects and advantages will become apparent from the following detailed description, taken in conjunction with the accompanying drawings.

DETAILED DESCRIPTION OF THE FIRST EMBODIMENT

Figure 1:
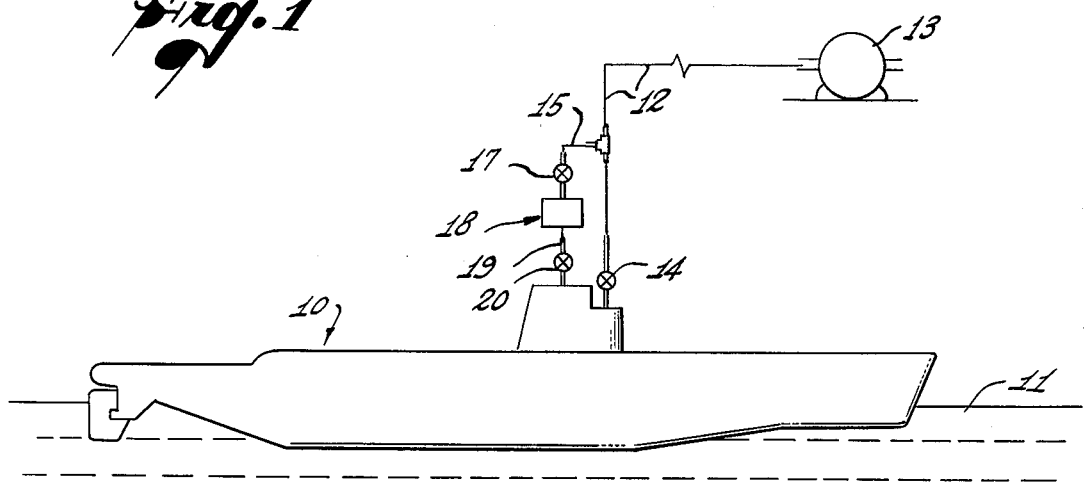
FIG. 1 is a schematic side elevational view showing a preferred manner of use of the apparatus of the invention between a submarine and a high-pressure source in the practice of the method of the invention.

Shown in FIG. 1 for purposes of illustration is a submarine 10 which is floating in a body of water 11 and which is connected by a main pressure line 12 to a dockside pressure source 13, such as a compressor capable of delivering air under a pressure on the order of 4100 to 4500 psi. Through the line 12, the pressure level in the submarine can be raised to the approximate level selected for the leakage test while a shut-off valve 14 in the line is opened. This valve then can be closed after the submarine has been pressurized to the approximate level for the test.

A branch line 15 is connected to the main pressure line 12 between the valve 14 and the compressor 13 to receive air under pressure from the compressor during the test, and extends, through a second shut-off valve 17, to an inlet of a test apparatus in accordance with the invention, which is indicated generally by the reference number 18. From an outlet of the test apparatus, another line 19 extends to the submarine, through a third valve 20, and communicates with the interior of the submarine. Typically, the lines 12 and 19 are connected to the high-pressure system of the submarine, through fittings (not shown) that are presently provided, but it is to be understood that there are various conventional ways in which the connections may be made.

Figure 2:
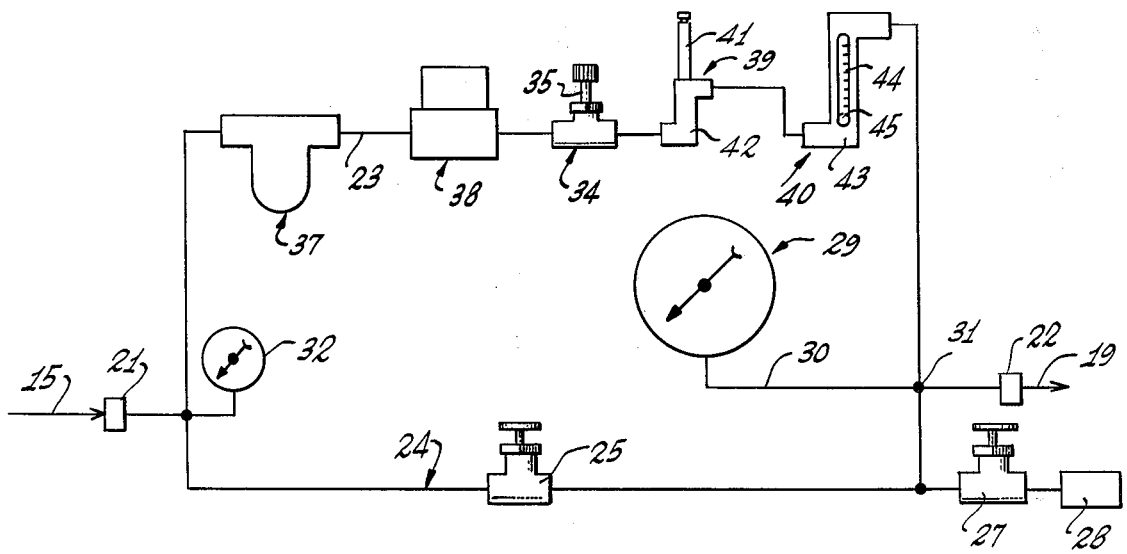
FIG. 2 is an enlarged schematic diagram of the basic components of the apparatus of the invention in the rate-measuring mode.

The basic components of the test apparatus 18 are shown in FIG. 2, in which the inlet and the outlet are represented by fittings 21 and 22 capable of being connected in air-tight relation to the branch lines 15 and 19. Two flow conduits 23 and 24 extend through the test apparatus between these fittings, the conduit 24 being a secondary or by-pass conduit of relatively large cross-section through which air from the compressor 13 can be admitted to the submarine 10 to adjust the test pressure level precisely to a selected test level preparatory to establishing a test flow through the other, primary flow conduit 23. A normally closed by-pass valve 25 in the secondary conduit can be opened to admit air as required to raise the submarine's pressure to a selected level, and then closed to terminate the flow. A dump valve 27 is connected to the secondary conduit between the by-pass valve 25 and the outlet 22 for use in bleeding air from the submarine through an exhaust 28 in order to lower the submarine's pressure to a test level that is lower than the level existing after temperature and pressure conditions have stabilized.

The pressure level in the submarine 10 is sensed and accurately indicated by a pressure gauge 29 in the test apparatus 18, connected by a line 30 to the juncture 31 of the conduits 23 and 24 adjacent the outlet fitting 22 of the apparatus. This gauge may be of various conventional types, one suitable gauge being model number H 5641 sold by Heise, Newtown, N.J., which is accurate to within a fraction of one percent, in a range of zero to 5000 psi. An inlet pressure gauge 32 preferably is provided adjacent the juncture 33 of the conduits adjacent the inlet fitting 21. This gauge is for reference purposes only, and need not have the high degree of accuracy of the gauge 29.

Flow through the primary flow conduit 23 is controlled by a valve 34 which is closed in the preparatory stages and can be opened to a selected extent to provide a finely adjusted flow rate in the primary conduit. For this purpose, the valve is of the needle-valve type, having rotatable valve member 35 which is selectively positioned relative to its seat (not shown) to vary the effective flow area through the valve.

Upstream from the flow-adjusting valve 34, to the left in FIG. 2, a filter 37 should be provided to remove particulate matter from the flow in the primary conduit 23. This filter may be inside or outside the apparatus 18. A pressure regulator 38 preferably is provided to facilitate control of the test pressure with the adjusting valve 34. This regulator may be of the type manufactured by Sterer Engineering and Manufacturing Co., Los Angeles, Calif., identified as part number 51850, and is set for a pressure level on the order of 4050 or 4100 psi, somewhat above the level to be maintained in the submarine during the test.

The two basic measuring instruments which, together with the gauge 29, are used to determine the leakage rate, are connected in the conduit 23 downstream from the adjusting valve 34, to the right in FIG. 2. These are a temperature monitor 39 and a flow meter 40 for accurately measuring the flow rate through the adjusting valve that is required to maintain the pressure in the submarine at the established test level. The temperature monitor has a bulb-type mercury theremometer 41 mounted in a housing 42 through which the test flow is passed, and the flow meter may be of various types, one suitable meter being the Brooks "Rotameter", Model 1455.

The illustrative flow meter 40 has a housing 43 through which the test flow is passed, to flow upwardly through a downwardly tapered transparent tube 44 that has a metal ball 45 therein and vertically spaced graduations marked as a scale along the tube. The ball is raised to different levels within the tube by different flow rates, and variations in the level of the ball are indicated, with a high degree of accuracy, by the scale. For example, the scale may extend from zero to fifteen, readable in increments of 0.1. When the meter has been carefully calibrated, these readings can be converted into standard-pressure values for the pressure level selected for, and maintained during, the test.

Although a separate mathematical calculation could be performed to determine the flow value for a particular scale reading at a particular test pressure, a set of reference tables (not shown) preferably is provided for rapid determination of the corresponding flow rate values at various pressure levels that may be used for the test. For example, tables can be provided for 3800, 3850, 3900, 3950, 4000, 4050, and 4100 psi, with values for scale readings from 0.5 through 15.0.

For the illustrative meter 40, it has been determined that, at 3800 psi, the standard-pressure flow rate for a reading of 0.5 is 0.560, and that each increment of 0.1 on the scale represents a flow-rate increase of 0.07436428. At 3900 psi, the flow-rate value for a scale reading of 0.5 is 0.568, and each 0.1 increment on the scale represents an increase of 0.07486428, and at 4000 psi, the 0.5 reading represents a flow rate of 0.575 and each 0.1 increment on the scale represents an increment of 0.07518571. A simple booklet can be prepared with a full set of values for all scale readings at each test level, and any desired number of tables can be included, depending upon the number of test levels for which values are made available in tabular form.

After the flow rate for a particular scale reading and pressure level scale reading has been determined, all that remains to be done is the conversion of the flow rate at the actual temperature to an equivalent flow rate at a standard temperature, to arrive at the SCFM value. This also is a mathematical conversion, which may be facilitated by a prepared reference table of correction factors for different measured Fahrenheit temperatures. For example, the factor for a test temperature of thirty degrees is 1.04, for 50° is 1.02, for 70° is 1.00, and for 90° is 0.09. A suitable table should provide a conversion factor for all temperature readings, in 1-degree increments, for the full range of possible temperatures, perhaps from 30° to 130 degrees. The temperature factor has no effect from 65° to 75°, and little effect for a substantial range on either side, and thus may be ignored in tests conducted at normal, moderate temperatures.

Figure 3:
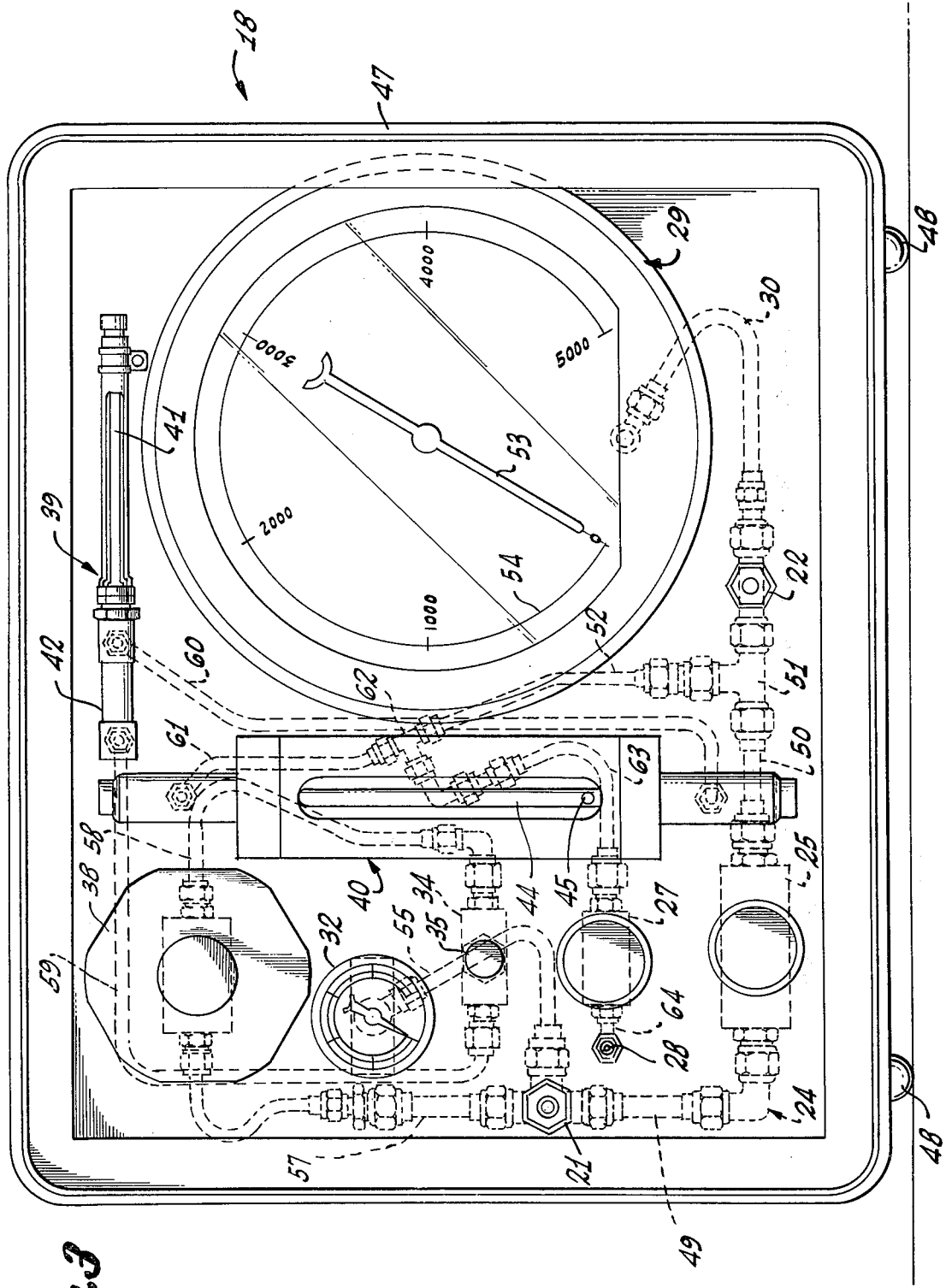
FIG. 3 is an enlarged side elevational view of an apparatus of FIG. 2, shown mounted in a suitcase-like housing from which the cover has been removed.

FIG. 3 illustrates, in somewhat simplified form, a physical arrangement of the various basic components of the test apparatus 18 in a housing 47 of the suitcase type, having a length of slightly more than 2 feet, a height less than 2 feet, and a width or depth of less than 1 foot, even when the protective lid or cover (not shown) is in place. The cover may be removable for easy access to the apparatus during the test, and provides space that can be used for the storage of reference materials.

As shown in FIG. 3, simple legs 48 are provided to support the housing in the upright position shown, and an outrigger leg (not shown) can be provided for propping the housing securely in this position. Care should be exercised to set up the apparatus in a horizontal position for accuracy in the test.

The inlet fitting 21 is adjacent the left side of the case, and the outlet fitting 22 is in the lower central portion. From the inlet fitting, piping 49 extends downwardly to the by-pass valve 25, from which a tube 50 extends laterally, to the right, to a "T" 51. One leg of this T is connected to the outlet 22, completing the secondary conduit 24, and the other leg is connected to tubing 52 that extends upwardly and forms the outlet end portion of the primary conduit 23.

The main pressure gauge 29 occupies the right portion of the housing 47, and receives vessel pressure from the outlet 22 through a tube forming the line 30 shown in FIG. 2. The face of this gauge is relatively large, and the path of the rotary pointer 53 is graduated in an arcuate scale 54 reading from zero to 5000 psi. The reference gauge 32 is disposed in the upper left portion of the housing and is connected by a tube 55 to the inlet side of the test apparatus.

Piping 57 extends upwardly from the inlet fitting 21 to the pressure regulator 38, in the upper left corner of the housing 47, and then downwardly at 58, behind the flow meter 40, to the right side of the adjusting valve 34. From the left side of this valve, a tube 59 extends to the inlet of the temperature monitor 39, and from the outlet of the monitor, another tube 60 carries the flow to the lower end portion of the flow meter 40, and introduces the flow into the lower end of the tapered tube 44. After passing upwardly through the flow meter, the flow is carried by a tube 61 to a T 62, connected by the tube 52 to the T 51 adjacent the outlet fitting 22, and by another tube 63 to the dump valve 27. This valve is connected by a tube 64 to the exhaust 28.

When the test apparatus 18 has been set up and connected between the two branch lines 15 and 19, assuming that the submarine 10 previously has been pressurized to approximately 4000 psi and that conditions have been permitted to stabilize, for example by waiting overnight, the valve 17 is opened to connect the test apparatus to the pressure source, which should supply air under pressure between 4100 and 4500 psi, as read on the reference gauge 32. The by-pass valve 25, the adjusting valve 34 and the dump valve 27 are closed at this stage, and the valve 20 can be opened to establish communication between the test apparatus and the submarine.

When the valve 20 is open, ship's pressure will be indicated on the main gauge 29, and can be adjusted either up or down to one of the test pressure levels for which tables are available. By opening the by-pass valve 25, the pressure can be raised to the next higher test level, and by opening the dump valve 27, the pressure can be lowered to the next lower level. In either event, both of these valves are closed when a precise test pressure has been established.

Then the adjusting valve 34 is cracked open and carefully adjusted as required to hold the test pressure at the selected level. Manipulation of the adjusting valve may be required over a short period of time, perhaps as long as thirty minutes, for temperature stabilization, after which the flow-rate reading is taken from the flow meter 40 and the temperature reading is taken from the temperature monitor 39. The test thus is complete, except for the conversion of the flow rate to standard cubic feet per minute, with the assistance of the conversion tables.

Accordingly, the valves 17 and 20 may be closed, so that the test apparatus 18 can be depressurized by opening the by-pass valve 25, the adjusting valve 34 and the dump valve 27. When this has been done, the test apparatus is disconnected and returned to proper condition for storage, either at dockside or on board the submarine, if desired, so as to be available whenever the need for another test arises. It should be noted that the on-board pressure systems may be used in conducting a test, if dockside pressure is not conveniently available.

DETAILED DESCRIPTION OF SECOND EMBODIMENT

Figure 4:
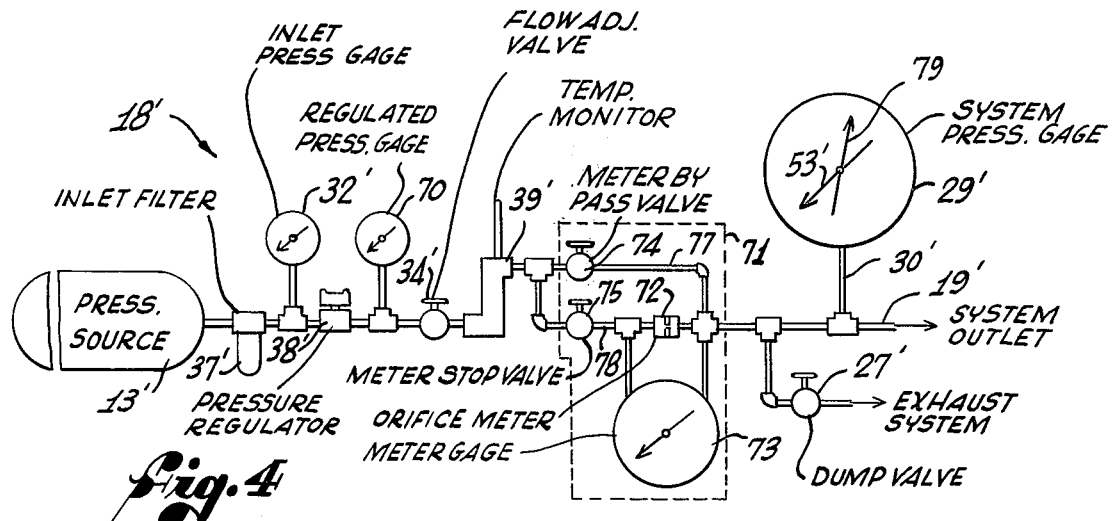
FIG. 4 is a schematic diagram similar to FIG. 2, illustrating the basic components of the go-no go mode.
Figure 5:
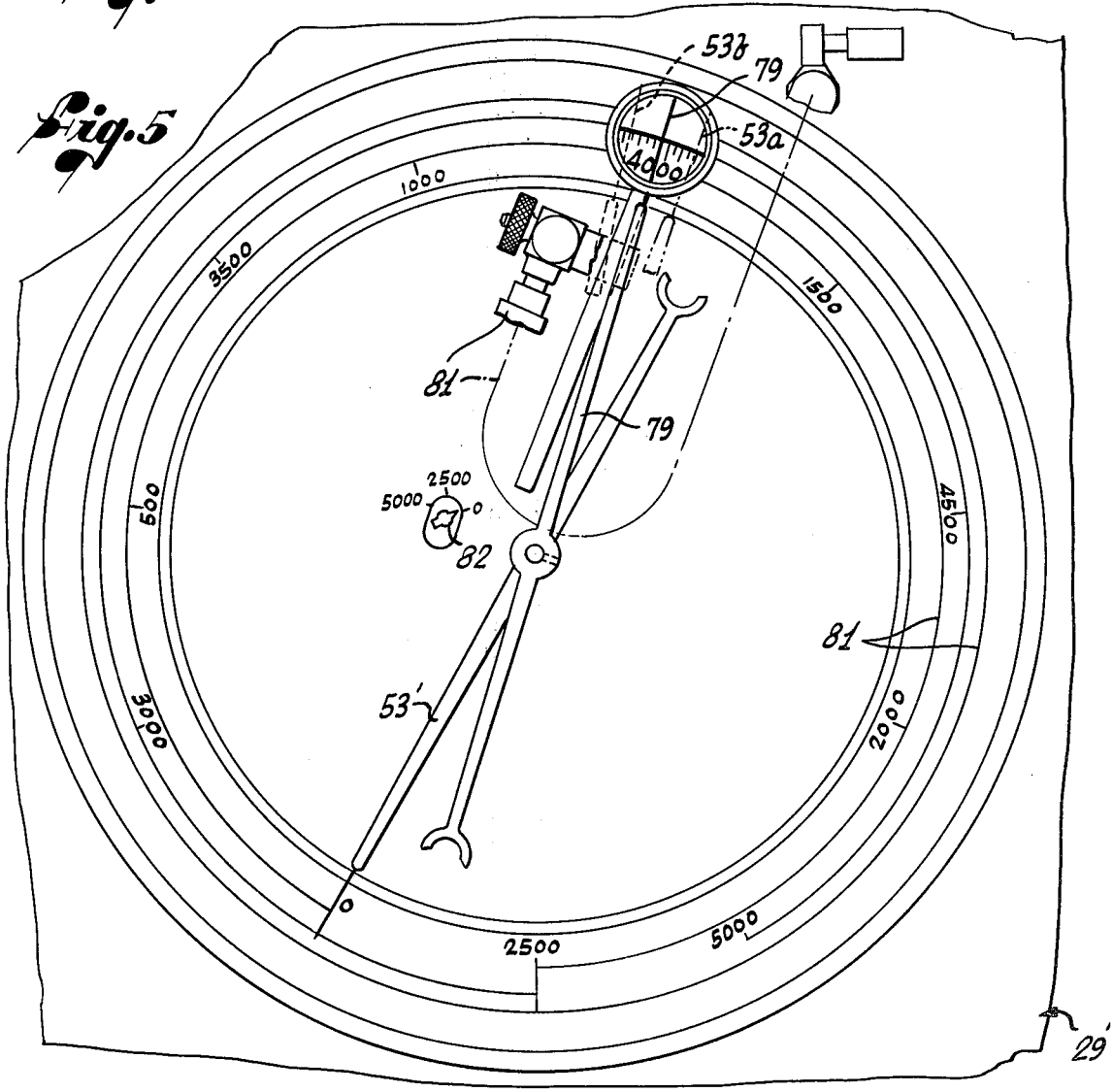
FIG. 5 is an enlarged fragmentary elevational view of the system pressure gauge of the apparatus of FIG. 4.

Illustrated in FIGS. 4 and 5 is a second embodiment of the invention, previously referred to as having a go-no go mode of operation. In addition to the flow measurement capability of the first embodiment, this mode also provides means for rapidly determining whether the leakage rate from the vessel is below the permissible maximum leakage rate. This mode is used when the quantitative value of the leakage rate need not be determined, and all that is required is a determination whether the leakage rate exceeds the specified maximum.

Structurally, the primary difference is the provision of means for delivering to the vessel a metered test flow that is equal to the maximum permissible leakage rate. Thus, instead of providing and measuring the flow necessary to maintain a constant system pressure by matching the rate of leakage, this mode introduces a constant test flow and determines, by reference to the system pressure, whether this flow is sufficient to match or exceed the leakage rate.

In the schematic diagram shown in FIG. 4, components corresponding to components shown in FIGS. 1 and 2 are indicated by corresponding, primed reference numbers. These components include a pressure source 13', an inlet filter 37', an inlet pressure gauge 32', a pressure regulator and relief valve 38', a flow adjusting valve 34', a temperature monitor 39', a system pressure gauge 29', and a dump valve 27'. Also included is a regulated-pressure gauge 70, between the regulator 39' and the valve 34'.

It will be seen that the flow meter 40 has been omitted, and in its place is a metering assembly 71 which cooperates with the source 13' and the flow adjust valve 34' to produce the desired metered flow to the vessel. This assembly comprises a metering orifice 72 through which the flow passes, a meter gauge 73 for indicating the pressure differential across the orifice, and two valves 74 and 75. The valve 74 opens and closes a bypass line 77 around the orifice, and the valve 75 opens and closes a line 78 leading to the orifice, and constituting part of the main flow conduit through the apparatus 18'. The flow from the orifice is introduced into the submarine through a line 19', to which the gauge 29' is connected by a line 30'.

In this embodiment, the gauge 29' is used not only to indicate the initial test pressure level in the submarine, but also to indicate the direction of departure of that pressure level from the initial level during the test. To facilitate the use of the gauge for this purpose, a so-called "dead-man's hand" 79 is provided on the gauge, in addition to the main hand or pointer 53 for indicating the pressure reading.

The dead-man's hand 79 preferably is identical to the pointer 53', and can be set in any position on the scale to indicate and maintain the initial pressure reading at which the test is commenced. To facilitate precise placement and reading, a magnifier 80 preferably is provided, on a flexible mount 81 which permits it to be moved to any desired position over the scale 81 of the gauge. In this instance, the scale is shown as reading from zero to 5000 psig, requiring two revolutions of the pointer to traverse the full range, as indicated by the small pointer 82. A suitable gauge for this purpose is Heise Model CMM (16 inch).

With the foregoing arrangement, system leakage upstream from the metering assembly does not affect the accuracy of the test procedure, and system leakage downstream can be held to a minimum within permissible tolerances. The metered flow through the orifice 72 thus will be delivered through the line 19' to the vessel.

To adapt the apparatus 18' for tests of different vessels or systems, with different pressure levels, and with different permissible leakage rates, a set of interchangeable metering orifices will be provided, with specified metered flow rates under specified pressure differentials. For example, one metering orifice may be provided for producing a flow rate of 2.5 cubic feet per minute in a 3000 psi test, with another orifice for producing the same, or a different, flow rate in a 4500 psi test.

For each such orifice, the precise pressure differential which will produce the required flow rate will be specified, and a reference table may be provided to provide corresponding flow rates and pressure differentials for that orifice at pressure test levels that are not precisely at the specified level for the test. Thus, it will not be necessary to bring the vessel pressure exactly to 3000 psi, for example, the test also being possible within a range of pressures above and below 3000 psi.

Since military or other specifications set the pressure level at which each test is to be conducted, and the maximum permissible leakage rate, a metering orifice can be provided that will produce a metered flow rate equal to the specified leakage rate, under a specified pressure differential. The design and manufacture of such orifices is within the skill of the art, although each orifice should be individually tested for precise flow-rate and pressure-differential values, which will be provided in reference tables for that orifice.

After the appropriate orifice 72 has been selected and installed, and assuming that the apparatus 18' has been connected between a source (such as a 6000 psi cylinder 13') and the vessel to be tested, with the valves 27', 34', 74 and 75 closed, and that the vessel has been pressurized to a stabilized level at which the test is to be conducted (such as 4000 psi), the valve (not shown) of the cylinder 13' is opened to apply source pressure to the inlet of the apparatus 18', and both the meter bypass valve 74 and the meter-stop valve 75 can be opened, along with the on-board stop valve (not shown) of the vessel. This activates the gauge 29'.

When the gauge reading is stabilized, the meter bypass valve 74 is closed, and the pressure regulator 38' is adjusted until the gauge 70 reads somewhat above the reading of the gauge 29', for example 100 to 300 psi higher. Then the flow-adjusting valve 34' is slowly and progressively opened to admit pressure fluid from the source 13' through the metering orifice 72, until the pressure differential across the orifice increases to the level specified to produce and maintain the correct metered flow through the orifice. This pressure differential, of course, is indicated by the gauge 73, which may have a range of zero to 25 psid.

When the foregoing has been accomplished, the dead-man's hand 79 is set precisely over the pointer 53', using the magnifier 80 for precision, and sufficient time is permitted to elapse for a pressure trend to develop in the vessel, as indicated by movement of the pointer 53'. The pressure-differential gauge is monitored to insure that the proper flow rate is maintained during this interval, which usually can be fifteen minutes, or less.

If the pressure indicated by the gauge 29' increases as indicated by movement of the pointer 53' upward from the dead-man's hand 79, toward the dotted-line position $53^a$ in FIG. 5, the leakage rate of the vessel is below the maximum permissible rate. If no change in the pressure occurs, the metered flow equals the leakage, which thus does not exceed the maximum permissible rate. On the other hand, if the pointer 53' begins to move toward the dotted-line position $53^b$ in FIG. 5, indicating falling system pressure, the leakage rate exceeds the metered flow, and thus is beyond the acceptable limit. The magnifier 80 expedites the detection of a very gradual pressure trend.

It is to be noted that the foregoing does not take into consideration the difference in temperatures of the metered flow and the leakage flow. The percentage influence of temperature is so slight that the temperature differential may be ignored under many circumstances, but if more precision is required, a temperature-correction factor can be applied, using the same principles discussed in connection with the first embodiment, for conversion from measured to standard values.

The temperature monitor 39' provides an accurate reading of the actual temperature of the test flow, from which a corrected test flow rate can be calculated to compensate for the temperature differential. As with the first embodiment, reference tables can be developed and provided to provide pressure-differential values for producing corrected test flow rates, and to avoid the necessity of calculating values for variable conditions.

From the foregoing, it should be evident that the present invention provides significantly improved testing methods and apparatus, which have numerous advantages over conventional methods and apparatus for pressure-testing submarines and other pressure systems for leakage. These advantages are found primarily in the simplicity, compactness, cost and portability of the apparatus with which the tests are performed, and in the simplicity of the test procedures themselves.

It also will be evident that, although specific modes of the invention have been illustrated and described, both with respect to the method and with respect to the apparatus, and specifically in connection with the testing of submarines, the invention also is applicable to the testing of other types of vessels, and systems, and various modifications and changes may be made without departing from the spirit and scope of the invention.

We claim as our invention:

1. The method of determining the rate of leakage of air from a submarine in standard units, comprising the steps of:
   pressurizing the submarine to a selected approximate level and permitting the temperature thereof to become stabilized;
   measuring the stabilized pressure level and adjusting it precisely to a selected test level;
   introducing an adjustable test flow of air into the submarine and adjusting the rate of the test flow as required to maintain the selected test level until a stabilized flow rate is obtained and said test level is maintained;
   accurately measuring the flow rate and the temperature of the test flow;
   converting the measured test flow rate at the pressure of said test level to an equivalent flow rate at a standard pressure, by applying a first conversion factor determined by the difference between the test pressure and the standard pressure;
   and converting the equivalent flow rate at the standard pressure and the measured temperature to an equivalent flow rate at the standard pressure and a standard temperature, by applying a second conversion factor determined by the difference between the measured temperature and the standard temperature.

2. The method defined in claim 1 including the further steps of:
   preparing in advance a plurality of pressure reference tables for a plurality of selected test levels, providing first conversion factors for a series of different measured flow rates at each of said test levels;
   preparing in advance a temperature reference table providing second conversion factors for a series of different measured temperatures;
   selecting the first conversion factor from the pressure reference table for the test level to which the pressure of the submarine is adjusted and maintained;
   and selecting from the temperature reference table the conversion factor for the measured temperature.

3. The method of determining the rate of leakage of gas from a pressurized vessel after the vessel has been pressurized and the pressure therein has stabilized, comprising the steps of:
   sensing the pressure of the gas in the vessel;
   adjusting the pressure of the gas in the vessel to a selected test level;
   introducing an adjustable test flow of gas into the vessel and adjusting the rate of said test flow as required to maintain the pressure at the selected test level;
   after a stabilized test flow rate is obtained, accurately measuring the flow rate and the temperature of the test flow;
   and converting the measured flow rate at the measured temperature and the test pressure level to an equivalent flow rate at a standard pressure level and a standard temperature.

4. The method as defined in claim 3 in which the measured flow rate is converted to an equivalent flow rate by:
   applying a pressure conversion factor determined by the difference between the selected test level and the standard pressure;
   and applying a temperature conversion factor determined by the difference between the measured temperature and the standard temperature.

5. The method as defined in claim 4 including the further steps of:
   preparing in advance a plurality of reference tables for a plurality of selected test levels, providing pressure conversion factors for a series of different measured flow rates at each of said test levels;
   and selecting the pressure conversion factor from one of the reference tables after measuring the flow rate at the selected test level.

6. The method as defined in claim 5 including the further steps of:
   preparing in advance a reference table providing temperature conversion factors for a series of different measured temperatures;
   and selecting the temperature conversion factor from the reference table after measuring the temperature.

7. The method of testing whether the rate of leakage of gas from a pressurized vessel exceeds a preselected leakage rate at a selected pressure level, comprising the steps of:
   establishing the selected pressure level in the vessel;
   introducing a variable test flow of gas under pressure into the vessel;
   monitoring the pressure level in the vessel while said test flow is being introduced;
   adjusting the test flow as necessary to maintain said selected pressure level; and
   measuring said test flow while said pressure level is maintained constant.

8. The method of testing whether the leakage rate of gas from a pressurized vessel exceeds a preselected leakage rate, at a selected pressure level, comprising the steps of:
   establishing the selected pressure level in the vessel;
   introducing a metered constant test flow of gas into the vessel at a rate equal to said preselected leakage rate;

and monitoring the pressure level to determine from changes therein whether the metered flow is less than the actual leakage rate, as indicated by a drop in said pressure level.

9. The method as defined in claim 8 in which said test flow is metered by supplying gas under pressure higher than said selected pressure level through an orifice capable of delivering a flow equal to said preselected leakage rate while a predetermined pressure differential is maintained across the orifice, and by maintaining said predetermined pressure differential until a pressure trend is detected in said vessel.

10. The method as defined in claim 8 including the further steps of accurately measuring the temperature of said test flow, and modifying said test flow to compensate for temperature differential.

11. Apparatus for determining the rate of leakage of gas from a pressurized vessel with a source of gas under pressure, comprising:
   means forming an inlet for connection to the source of gas under pressure and an outlet for connection to the vessel;
   means defining a main flow conduit through said apparatus between said inlet and said outlet;
   a flow meter for accurately measuring the rate of flow through said main flow conduit;
   a temperature monitor for accurately measuring the temperature of gas flowing through said main flow conduit;
   means for accurately indicating the pressure of gas in said vessel;
   and means for controlling the rate of flow through said main flow conduit and adjusting the flow rate to maintain the pressure of gas in said vessel at a selected test level, whereby the rate and temperature of the flow equal to the leakage from said vessel can be measured and the flow rate can be converted to standard units by application of temperature and pressure conversion factors determined by pressure indicated by said indicating means and the temperature measured by said temperature monitor.

12. Apparatus as defined in claim 11 further including a secondary flow conduit from said inlet and said outlet, by-passing said main flow conduit, and selectively operable means for controlling flow through said secondary conduit to increase the pressure of gas in said vessel to a selected test level.

13. Apparatus as defined in claim 12 further including selectively operable means for bleeding gas from said vessel to reduce the pressure therein to a selected test level.

14. Apparatus as defined in claim 11 further including a pressure regulator in said main flow conduit between said inlet and said rate-controlling means for maintaining a preselected pressure in said main flow conduit.

15. Apparatus as defined in claim 11 in which said rate-controlling means is a valve having a selectively movable valve member for varying the flow area through the valve.

16. Apparatus as defined in claim 11 in which said pressure-indicating means is a pressure gauge communicating with said main flow conduit to indicate the pressure therein adjacent said outlet.

17. Apparatus as defined in claim 11 in which the elements of the apparatus are mounted in a portable case.

18. Apparatus for testing whether the rate of leakage of gas from a pressurized vessel exceeds a preselected leakage rate at a selected pressure level, with a source of gas under pressure higher than said pressure level, comprising:
   means forming an inlet for connection to the source and an outlet for connection to the vessel;
   means defining a flow conduit between said inlet and said outlet;
   gauge means for indicating changes in the pressure of gas in the vessel;
   and means for regulating the rate of flow through said flow conduit from the source to the vessel, and establishing the flow at a known rate, whereby the leakage rate can be determined in relation to said known rate from its effect on the pressure in the vessel, including an orifice capable of delivering a flow rate equal to said preselected leakage rate when a predetermined pressure differential is established across said orifice, and means for establishing and maintaining said predetermined pressure differential across said orifice.

19. Apparatus as defined in claim 18 in which the means for establishing and maintaining said pressure differential comprises an adjusting valve for regulating the flow to said orifice from the source, and a gauge for indicating the pressure differential across said orifice.

20. Apparatus as defined in claim 18 in which said gauge means comprise a gauge having a first indicator for indicating the existing pressure level in the vessel, and a second indicator selectively positionable at the position of said first indicator, to indicate the initial pressure level and thereby facilitate the detection of changes in the pressure level.

21. Apparatus as defined in claim 18 in which said regulating means include a flow regulator for adjusting the flow through said conduit until the flow maintains the pressure in the vessel constant, and a flow meter for accurately measuring the adjusted flow.

* * * * *